United States Patent [19]

Vollmer

[11] Patent Number: 4,956,837
[45] Date of Patent: Sep. 11, 1990

[54] APPARATUS FOR AVOIDING SPECTRUM SPREADING WHEN SWITCHING A TRANSMITTER ON AND OFF

[75] Inventor: Per C. M. Vollmer, Handen, Sweden
[73] Assignee: Telefonaktiebolaget L M. Ericsson, Stockholm, Sweden
[21] Appl. No.: 241,305
[22] Filed: Sep. 7, 1988
[30] Foreign Application Priority Data
Sep. 8, 1987 [SE] Sweden ............................ 8703483
[51] Int. Cl.$^5$ .......................................... H04B 7/005
[52] U.S. Cl. ....................................... 370/20; 370/77
[58] Field of Search ................... 370/20, 77, 113, 119; 375/39; 455/116, 127

[56] References Cited
U.S. PATENT DOCUMENTS
4,494,239  1/1985  Martin ................................. 370/20
4,644,531  2/1987  Sasaki ................................. 370/77

Primary Examiner—Douglas W. Olms
Assistant Examiner—Melvin Marcelo
Attorney, Agent, or Firm—Burns, Doane, Swecker & Mathis

[57] ABSTRACT

An apparatus for avoiding spectrum spreading in switching on and off a transmitter in a station included in a time multiplexed radio transmission system, e.g. a mobile telephony system, where two mutually 90-degree phase-shifted baseband signals (sin a(t), cos a(t)) are generated, each of these signals being intended to modulate a carrier wave. The apparatus includes means (MP, DAP, DAI, DAQ) achieving that the power of the baseband signals follows an increasing reference level at the start of each time slot and follows a decreasing reference level at the end of each time slot.

5 Claims, 1 Drawing Sheet

APPARATUS FOR AVOIDING SPECTRUM SPREADING WHEN SWITCHING A TRANSMITTER ON AND OFF

TECHNICAL FIELD

The invention relates to an apparatus for avoiding spectrum spreading when switching a transmitter on and off in a station included in a time multiplexed radio transmission system, e.g. a mobile telephony system, where two baseband signals mutually phase shifted 90 degrees are generated, each being intended for modulating a carrier wave.

BACKGROUND ART

In switching a radio transmitter on and off, so-called spectrum spreading occurs, i.e. the transmitted frequency spectrum is considerably wider than for continuous transmission. Spectrum spreading therefore occurs in such as time multiplexed mobile telephony systems, since the transmitted power from each mobile station goes down to zero after each time slot. The spectrum spread can thus cause noise in channels utilizing other frequencies.

Spectrum spreading occurs in the use of frequency-jumping equipment also. It is known to reduce such spectrum speading by utilizing an RC network in a regulating loop for controlling the output power of the final stage. Here the output power is controlled such that it increases from zero to a maximum value during a time interval immediately after each frequency jump, and vice versa immediately before each frequency jump. The decrease in spectrum spreading is dependent on along what imaginary curve the output power is increased or decreased. This curve is in turn dependent on the complexity of the RC network and thereby also to the cost of the network.

It is conceivable to utilize a similar technique for reducing the spectrum spread in a time multiplexed radio transmission system e.g. a mobile telephony system. In practice, however, it would not be possible to achieve sufficient spectrum attenuation for such a system with the aid of an RC network according to the above, with retention of reasonable complexity of this network and thus the cost of it.

DISCLOSURE OF INVENTION

The object of the present invention is to provide an apparatus of the kind mentioned in the introduction, with which spectrum spread is avoided without needing to utilize a complicated and expensive network according to the above. This is achieved by the power of the baseband signals at the beginning of each time slot being controlled to accompany an increasing reference level, and at the end of each time slot they are controlled to accompany a decreasing reference level.

The characterizing features of the invention are apparent from the claims.

BRIEF DESCRIPTION OF DRAWING

The invention will now be described in more detail and with reference to the drawing, on which

BEST MODE FOR CARRYING OUT THE INVENTION

Figure 1:
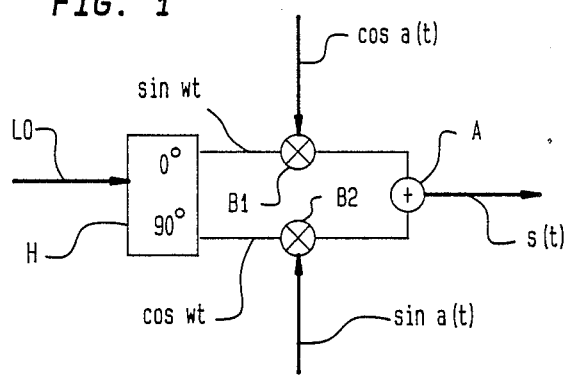
FIG. 1 illustrates a known circuit for generating a radio signal in a transmitter.

A known circuit for generating a radio signal in a transmitter is illustrated in FIG. 1. LO is a local oscillator signal which is supplied to a so-called 90-degree hybrid circuit denoted by H. Two signals sin wt and cos wt mutually phase shifted at 90 degrees are generated by the local oscillator signal in this circuit. These signals are mixed with two 90-degree mutually phase-shifted signals, cos a(t) and sin a(t), in a mixer B1 for sin wt and a mixer B2 for cos wt. The output signals from the mixers are added in an adder A to form a signal s(t), which is supplied to the final stage of the transmitter. The signal s(t) is equal to sin wt×cos a(t)+cos wt×sin a(t), which is in turn equal to sin (wt+a(t)). A circuit according to FIG. 1 is usually called a quadrature modulator.

The base band signals sin a(t) and cos a(t) form two so-called quadrature channels, which are usually designated the I channel (inphase) and Q channel (quadraturephase). The signals of the quadrature channels can be formed in different ways in response to the selected modulation form. One way of forming these is by so-called "table-look-up" in a digital memory, a digital input data flow controlling addressing of the memory. The memory then generates both the mutually phase shifted signals in digital form, which, after digital-analogue conversion and lowpass filtering, are supplied to the mixers corresponding to the mixers B1 and B2 in FIG. 1. In modulation according to random QAM or QPSK (quadrature amplitude modulation or quadrature phase shift keying) a sinus-shaped signal is generated, the phase angle of which is turned in one or other direction in response to the latest arrived data bit.

Figure 2:
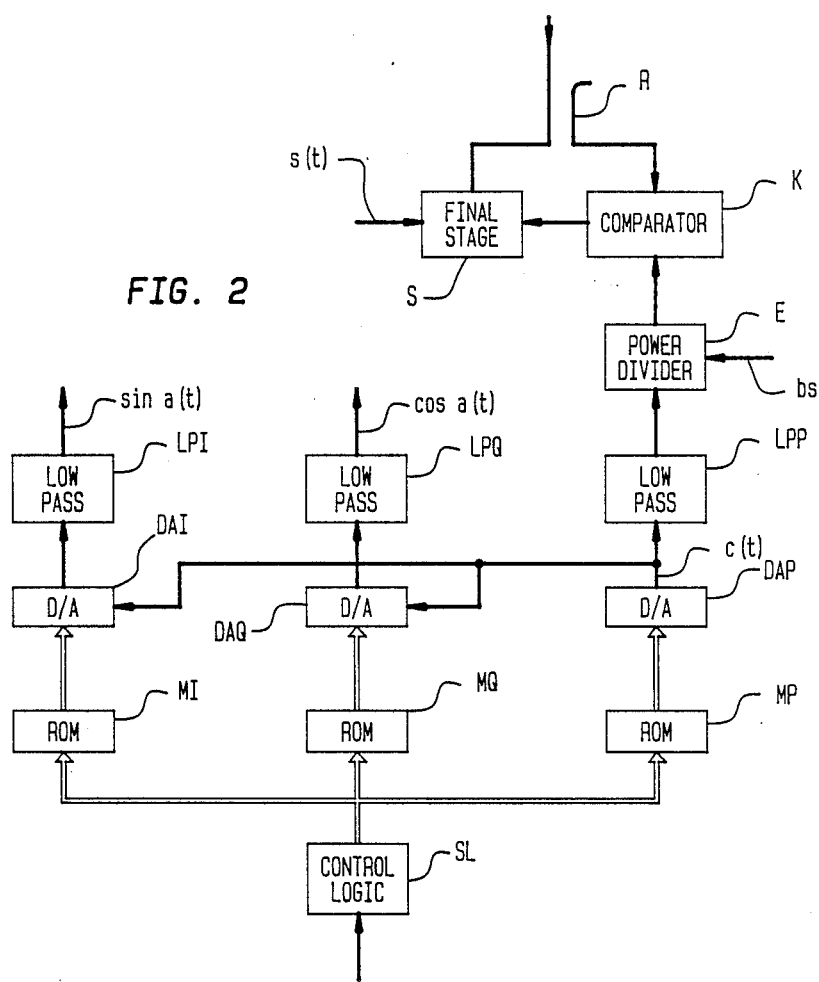
FIG. 2 is a block diagram of an apparatus in accordance with the invention.

FIG. 2 is a block diagram of an apparatus in accordance with the invention. A means denoted by SL, for control logic, is conventionally arranged such that in response to an input data flow it generates address signals to two memories, MI and MQ, which are included in an I channel and a Q channel, respectively, which are assigned to two quadrature channels. The memories are of the ROM type, for example, and give digital values corresponding to two signals mutually phase-shifted 90 degrees. Analogue counterparts to the digital output signals of the memories are generated in digital-analogue converters DAI and DAQ connected to the memories. The analogue values are supplied to lowpass filters LPI and LPQ, the output signals of which are respectively denoted sin a(t) and cos a(t) and agree with corresponding signals in FIG. 1.

The control logic means SL can include, inter alia, a binary counter which is stepped forward at a rate which is, for example, eight times greater than the data flow bit rate. Eight address signals to the memory MI and MQ are thus generated for each incoming data bit.

In accordance with the invention, the control logic means SL is also connected to a third memory MP, of the same kind as the memories MI and MQ. The control logic means SL and the memory MP are arranged such that the memory sends digital values, the levels of which increase successively along a predetermined, imagined curve from zero and to a maximum value, during a given number of the first data bits in each time slot, which are assigned to the station in question. During the greater part of the time slot, the memory subsequently sends the maximum digital value, and during a given number of the last data bits in the time slot digital values are set, which successively decrease along a predetermine*d, imagined curve from the maximum value down to zero. For this purpose, the control logic means SL can include a binary counter which is stepped forward at a rate which is, for example, eight times greater than the bit rate of the data flow during the above-mentioned number of the first or last data bits in the station time slot when the memory is to give increasing or decreasing digital values. The count value of the counter should be kept constant for the remaining data bits in the time slot, i.e. during the greater part of the time slot, whereby the necessary memory capacity can be kept low. For example, if the counteer is stepped forward for the first eight and the last eight data bits in the time slot and with eight times as great a rate as the bit rate of the data flow, the memory will have to store $2 \times 8 \times 8 = 128$ digital values. The number of stored digital values can be reduced to half, should the counter be arranged for counting up at the beginning of the time slot and counting down at the end of the time slot.

The digital values from the memory PM are converted to analogue form in a digital-analogue converter DAP, subsequent to which the analogue values are supplied to the control inputs of the digital-analogue converters DAI and DAQ for controlling the gain in these means. By "gain" is intended in this case the maximum output voltage of the converter, i.e. the output voltage swing of the converter. Such a controllable converter can of course be replaced by one that cannot be controlled followed by a controllable amplifier. The varying voltage from the converter DAP is thus utilized as a control signal from amplification of the baseband signals sin a(t) and cos a(t) and is denoted c(t). The amplification in the converter DAP can be imagined as being controlled by an unillustrated fixed reference voltage. By the amplification of the quadrature channels under controlled conditions increasing from zero at the beginning of each time slot and decreasing to zero at the end of each time slot, the undesirable spectrum spread occuring during switching the transmitter on and off is reduced considerably.

The reduction of the spectrum spread is responsive to along what imagined curve the power of the quadrature channel signals sin a(t) and cos a(t) is increased or decreased. Suitable curve shapes are such as the cosinus shape and the Gaussian shape. The curve is stored in the memory MP and can thus be selected optionally when being written into the memory.

The analogue signal from the converter DAP is also supplied to a lowpass filter LPP and thereafter to a regulating loop for controlling the output power from the final stage of the amplifier, this stage being denoted S. The final stage is also supplied a radio signal s(t), which has been generated in a circuit according to FIG. 1, for example. In the illustrated example, the regulating loop comprises a means E which is supplied the lowpass filtered control signal from the lowpass filter LPP and a control signal bs. The signal bs is generated for controlling the maximum output power of the final stage to a desired value. The signal bs can be derived from such as a received field strength. The means E can be a so-called power divider, e.g. comprising a fixed and a controllable resistor and which generates a criterion value for the outgoing signal strength from the station's final stage. The criterion value from the means E is compared with an actual value in a comparator K, the output signal of which controls the output power of the final stage S. The actual value can thereby be derived from a directional switch R which senses the output power of the final stage.

Undesirable signals occur, as a result of local oscillator leakage, due to imperfection in the components in the mixers. When this leakage exceeds the desired signal power, which can occur, inter alia, during switching on and off, more attenuation than achieved by the regulating loop is required. However, it is not necessary that the regulating loop includes the means E (power divider), although the lack of it will result in the maximum output power of the final stage S will not be controllable.

I claim:

1. Apparatus for avoiding spectrum spreading caused by switching on and off a transmitter in a station included in a time multiplexed radio transmission system comprising:
   means for generating two mutually 90-degree phase shifted baseband signals for modulating a carrier wave;
   means for controlling the power of the baseband signals during a given time period in the beginning of each transmission time slot, which is assigned to the station, such that the power of each baseband signal at least practically follows an at least substantially increasing reference level; and
   means for controlling the power of the baseband signals during a given time period at the end of each such time slot such that the power of each baseband signal at least practically follows an at least substantially decreasing reference level.

2. Apparatus as claimed in claim 1, wherein the baseband signals are each generated in a table look-up memory and a digital-analogue converter associated with each memory wherein said increasing or decreasing reference level are generated in a further table look-up memory and a digital-analogue converter associated with this further memory and generating a control signal for controlling the gain of the baseband signals, and further including control logic means for generating address signals to the memories in response to an input data flow supplied to the apparatus.

3. Apparatus as claimed in claim 2, wherein the gain of the baseband signals is controlled by controlling the gain of the digital-analogue converters associated with the memories for generating the baseband signals.

4. Apparatus as claimed in claim 2 further including a regulating loop for controlling the output power of the transmission in response to said control signal.

5. Apparatus as claimed in claim 3, further including a regulating loop for controlling the output power of the transmission in response to said control signal.

* * * * *